US012203784B2

(12) United States Patent
Kim

(10) Patent No.: US 12,203,784 B2
(45) Date of Patent: Jan. 21, 2025

(54) STEERING ANGLE SENSING DEVICE AND TORQUE ANGLE SENSOR MODULE HAVING THE SAME

(71) Applicant: HL MANDO CORPORATION, Gyeonggi-do (KR)

(72) Inventor: Jinhwan Kim, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 132 days.

(21) Appl. No.: 18/119,677

(22) Filed: Mar. 9, 2023

(65) Prior Publication Data

US 2023/0296411 A1    Sep. 21, 2023

(30) Foreign Application Priority Data

Mar. 15, 2022 (KR) .................. 10-2022-0032402

(51) Int. Cl.
*G01D 5/245* (2006.01)
*B62D 6/10* (2006.01)
*B62D 15/02* (2006.01)
*G01D 5/14* (2006.01)

(52) U.S. Cl.
CPC .............. *G01D 5/245* (2013.01); *B62D 6/10* (2013.01); *B62D 15/0215* (2013.01); *G01D 5/145* (2013.01); *G01D 2205/26* (2021.05); *G01D 2205/28* (2021.05)

(58) Field of Classification Search
CPC .............. G01D 5/245; G01D 2205/26; G01D 2205/28; G01D 5/145; G01D 5/12; B62D 15/0215; B62D 6/10; G01B 7/30; G01L 3/10; B60Y 2400/301; B60Y 2400/307

USPC .................................................. 324/207.22
See application file for complete search history.

(56) References Cited

U.S. PATENT DOCUMENTS

| | | | | |
|---|---|---|---|---|
| 2008/0307873 | A1* | 12/2008 | Kang ............... | G01D 5/145 |
| | | | | 73/117.02 |
| 2018/0086375 | A1* | 3/2018 | Lee ............... | G01B 7/30 |
| 2018/0127026 | A1* | 5/2018 | Kim ............... | G01D 5/145 |

FOREIGN PATENT DOCUMENTS

KR    10-1395848    5/2014

* cited by examiner

*Primary Examiner* — Raul J Rios Russo
(74) *Attorney, Agent, or Firm* — WOMBLE BOND DICKINSON (US) LLP

(57) ABSTRACT

Disclosed herein are a steering angle sensing device and a torque angle sensor module having the same. The steering angle sensing device includes a main gear rotating at the same angle as a steering shaft, a first sub-gear rotatably engaging with the main gear, a second sub-gear rotatably engaging with the main gear and having a number of teeth different from that of the first sub-gear, a third sub-gear rotatably engaging with the main gear and having a number of teeth different from that of each of the first sub-gear and the second sub-gear, a first magnetic sensor detecting a change in magnetic force of the first sub-gear, a second magnetic sensor detecting a change in magnetic force of the second sub-gear, a third magnetic sensor detecting a change in magnetic force of the third sub-gear, and a control device calculating a steering angle from the change in magnetic force detected by each of the first magnetic sensor, the second magnetic sensor, and the third magnetic sensor.

20 Claims, 7 Drawing Sheets

STEERING ANGLE SENSING DEVICE AND TORQUE ANGLE SENSOR MODULE HAVING THE SAME

CROSS REFERENCE TO RELATED APPLICATION

This application claims priority from and the benefits of Korean Patent Application No. 10-2022-0032402, filed on Mar. 15, 2022, which is all hereby incorporated by reference in its entirety.

TECHNICAL FIELD

The present disclosure generally relates to a steering angle sensing device and a torque angle sensor module having the same.

BACKGROUND

Generally, a steering system is a device for changing the course and driving direction of a vehicle according to a driver's request. The vehicle uses a power-assisted steering system as a means for reducing the steering force of a steering wheel and ensuring the stability of a steering state. As such a power-assisted steering system, a hydraulic power steering system (HPS) using hydraulic pressure has been widely used in the vehicle. However, recently, an eco-friendly electronic power steering system (EPS), which makes a driver's steering operation easy using the rotating force of a motor, is commonly installed in the vehicle.

Such an electronic power steering system (EPS) operates the motor in an electronic control device (ECU) according to the driving conditions of the vehicle detected by a vehicle speed sensor, a steering angle sensing device, or a steering torque measuring device, so that the system imparts a light and comfortable steering feeling at low speed driving, imparts a heavy steering feeling and good directional stability at high speed driving, and provides a rapid steering-wheel restoring force according to the rotating angle of the steering wheel so that rapid steering is performed in the event of emergency, thereby providing optimal steering conditions for a driver. In this regard, the steering angle sensing device is connected to the steering shaft to detect the rotating angle of the steering wheel, thereby transferring data on a driver's steering intention (e.g. angle or angular velocity) to the electronic control device (ECU). A method of detecting the angle of the steering wheel by a conventional steering angle sensing device is disclosed in Patent Document 1 below.

However, recently, the vehicle is equipped with various safety devices capable of achieving more precise and stable driving operations through electrification of a vehicle control device, for example, various safety devices such as a vehicle dynamic control or a traction control system. In order to secure stable performance of the safety device, precision and reliability of input data used to determine whether the safety device is operated or not are required. Therefore, a high degree of precision is required for the steering angle sensing device.

Documents of Related Art (Patent Document 1) Korean Patent No. 10-1395848

SUMMARY

In view of the above, the present disclosure provides a steering angle sensing device capable of precisely sensing a steering angle.

Further, the present disclosure provides a torque angle sensor module having the steering angle sensing device.

The present disclosure provides a steering angle sensing device including a main gear rotating at the same angle as a steering shaft, a first sub-gear rotatably engaging with the main gear, a second sub-gear rotatably engaging with the main gear and having a number of teeth different from that of the first sub-gear, a third sub-gear rotatably engaging with the main gear and having a number of teeth different from that of each of the first sub-gear and the second sub-gear, a first magnetic sensor detecting a change in magnetic force of the first sub-gear, a second magnetic sensor detecting a change in magnetic force of the second sub-gear, a third magnetic sensor detecting a change in magnetic force of the third sub-gear, and a control device calculating a steering angle from the change in magnetic force detected by each of the first magnetic sensor, the second magnetic sensor, and the third magnetic sensor.

The steering angle sensing device may further include a circuit board on which the first magnetic sensor, the second magnetic sensor, and the third magnetic sensor are mounted. A magnetic body may be coupled to each of the first sub-gear, the second sub-gear, and the third sub-gear, and each of the first magnetic sensor, the second magnetic sensor, and the third magnetic sensor may be disposed to face the magnetic body coupled to each of the first sub-gear, the second sub-gear, and the third sub-gear.

The control device may detect a first relative angle at which the first sub-gear rotates as the main gear rotates, a second relative angle at which the second sub-gear rotates as the main gear rotates, and a third relative angle at which the third sub-gear rotates as the main gear rotates.

The control device may calculate a first absolute angle calculated using the first relative angle and the second relative angle, a second absolute angle calculated using the second relative angle and the third relative angle, and a third absolute angle calculated using the first relative angle and the third relative angle.

The control device may cross-verify the first absolute angle, the second absolute angle, and the third absolute angle to determine a final absolute angle.

Further, the control device may calculate an absolute angle using all of the first relative angle, the second relative angle, and the third relative angle.

A range of the absolute angle which may be calculated by the control device using all of the first relative angle, the second relative angle, and the third relative angle may be set larger than a range of the absolute angle which may be calculated using two relative angles among the first relative angle, the second relative angle, and the third relative angle.

The present disclosure provides a torque angle sensor module including a torque measuring device coupled to a steering shaft to measure a torque, and a steering angle sensing device detecting a steering angle of the steering shaft. The steering angle sensing device includes a main gear rotating at the same angle as the steering shaft, a first sub-gear rotatably engaging with the main gear, a second sub-gear rotatably engaging with the main gear and having a number of teeth different from that of the first sub-gear, a third sub-gear rotatably engaging with the main gear, and having a number of teeth different from that of each of the first sub-gear and the second sub-gear, a first magnetic sensor detecting a change in magnetic force of the first sub-gear, a second magnetic sensor detecting a change in magnetic force of the second sub-gear, a third magnetic sensor detecting a change in magnetic force of the third sub-gear, and a control device calculating the steering angle from the change in magnetic force detected by each of the first magnetic sensor, the second magnetic sensor, and the third magnetic sensor.

The steering angle sensing device may further include a circuit board on which the first magnetic sensor, the second magnetic sensor, and the third magnetic sensor are mounted. A magnetic body may be coupled to each of the first sub-gear, the second sub-gear, and the third sub-gear, and each of the first magnetic sensor, the second magnetic sensor, and the third magnetic sensor may be disposed to face the magnetic body coupled to each of the first sub-gear, the second sub-gear, and the third sub-gear.

The control device may detect a first relative angle at which the first sub-gear rotates as the main gear rotates, a second relative angle at which the second sub-gear rotates as the main gear rotates, and a third relative angle at which the third sub-gear rotates as the main gear rotates.

The control device may calculate a first absolute angle calculated using the first relative angle and the second relative angle, a second absolute angle calculated using the second relative angle and the third relative angle, and a third absolute angle calculated using the first relative angle and the third relative angle.

The control device may cross-verify the first absolute angle, the second absolute angle, and the third absolute angle to determine a final absolute angle.

The control device may calculate an absolute angle using all of the first relative angle, the second relative angle, and the third relative angle.

A range of the absolute angle which may be calculated by the control device using all of the first relative angle, the second relative angle, and the third relative angle may be set larger than a range of the absolute angle which may be calculated using two relative angles among the first relative angle, the second relative angle, and the third relative angle.

The torque angle sensor module may further include a support member aligning and supporting the circuit board, the first sub-gear, the second sub-gear, and the third sub-gear, and a case accommodating the torque measuring device, the steering angle sensing device, and the support member therein.

Advantageous Effects

According to an embodiment of the present disclosure, a steering angle sensing device can significantly improve the precision of a steering angle to be sensed.

Further, according to an embodiment of the present disclosure, a torque angle sensor module can include a steering angle detection sensor capable of precisely detecting a steering angle.

DETAILED DESCRIPTION

Figure 1:
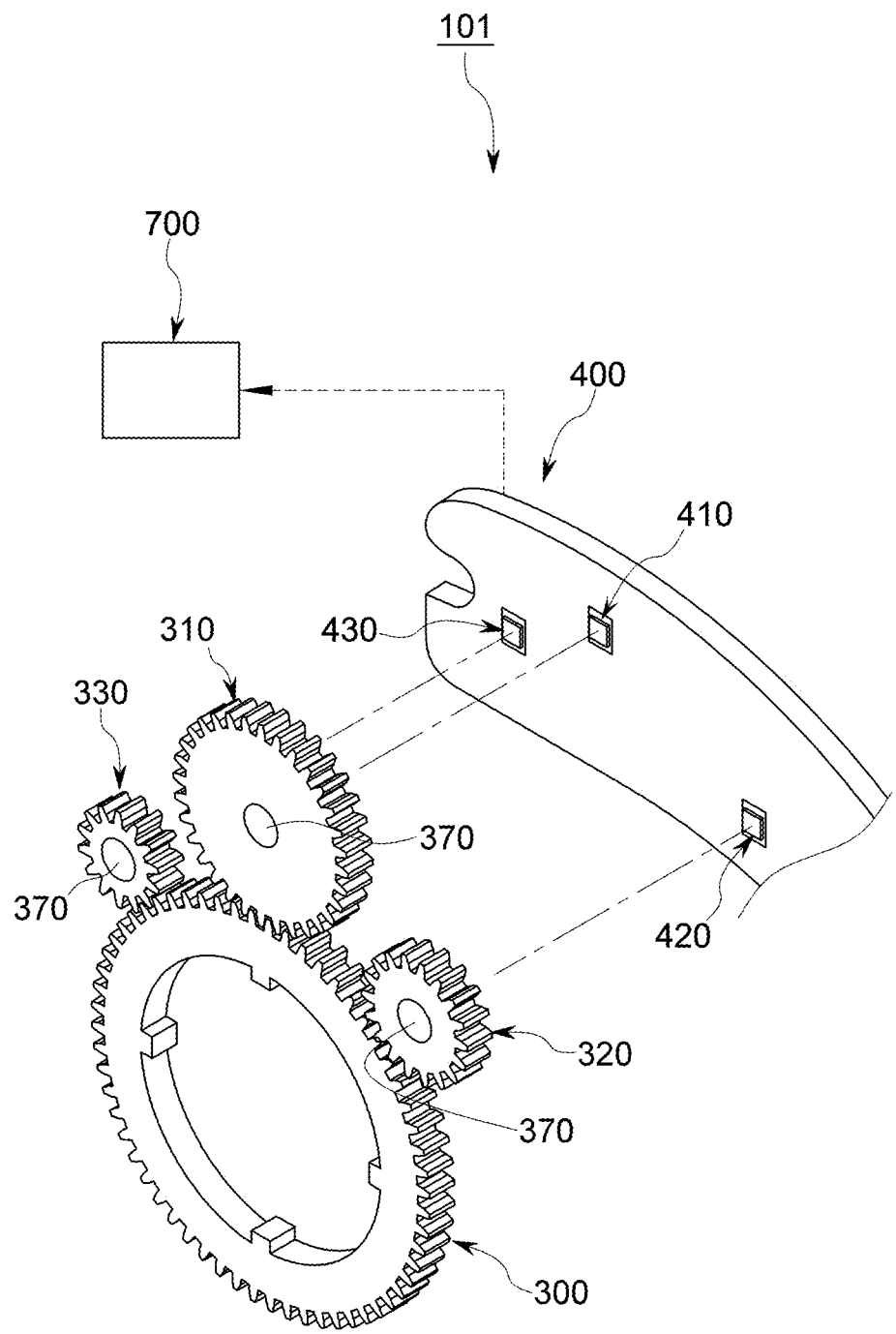
FIG. 1 is an exploded perspective view showing a steering angle sensing device according to a first embodiment of the present disclosure.

Hereinafter, embodiments of the present disclosure will be described in detail such that those skilled in the art can easily practice the present disclosure with reference to the accompanying drawings. The present disclosure may be implemented in various forms without being limited to embodiments described herein.

It is to be noted that the drawings are schematic and are not drawn to scale. The size or shape of components shown in the drawings may be exaggerated for the clarity and convenience of description. Any dimensions are merely illustrative and not limiting. Furthermore, the same reference numerals are used throughout the drawings to designate the same or similar components.

The embodiments of the present disclosure specifically represent ideal embodiments. As a result, various variations of the diagram are expected. Therefore, the embodiment is not limited to the specific shape of an illustrated region, and also covers the modification of the shape by manufacturing.

Unless differently defined, all technical or scientific terms used herein have the same meanings as the terms generally understood by those skilled in the art to which the present disclosure pertains. All terms used herein are intended to more clearly describe the present disclosure, and are not intended to limit the scope of the present disclosure.

Further, expressions "comprising", "including", "having", etc. used herein should be interpreted as open-ended terms embracing other embodiments, unless otherwise stated herein.

In the present disclosure, the singular forms are intended to include the plural forms as well, unless the context clearly indicates otherwise.

Although terms "first", "second", etc. are used herein to distinguish one element from another element, the order or importance of the elements is not limited by these terms.

Hereinafter, a steering angle sensing device 101 according to a first embodiment of the present disclosure will be described with reference to FIGS. 1 to 4. The steering angle sensing device 101 according to the first embodiment of the present disclosure is connected to a steering shaft to sense the rotation of a steering wheel and thereby measure data on a driver's steering intention. Examples of the driver's steering intention may include a rotating direction, a rotating angle, an angular velocity, etc.

As shown in FIG. 1, the steering angle sensing device 101 according to the first embodiment of the present disclosure includes a main gear 300, a first sub-gear 310, a second sub-gear 320, a third sub-gear 330, a first magnetic sensor 410, a second magnetic sensor 420, a third magnetic sensor 430, and a control device or controller 700.

The main gear 300 rotates at the same angle as the steering shaft. To be more specific, the main gear 300 may be connected to the steering shaft which rotates as the steering wheel rotates. Thus, if the steering shaft rotates while the steering wheel rotates, the main gear 300 is also rotated.

The first sub-gear 310 rotatably engages with the main gear 300.

The second sub-gear 320 rotatably engages with the main gear 300, and has the number of teeth different from that of the first sub-gear 310.

The third sub-gear 330 rotatably engages with the main gear 300, and has the number of teeth different from that of each of the first sub-gear 310 and the second sub-gear 320.

In other words, the first sub-gear 310, the second sub-gear 320, and the third sub-gear 330 to the main gear 300 have different gear ratios. Thus, as the main gear 300 rotates, the first sub-gear 310, the second sub-gear 320, and the third sub-gear 330 are rotated at different angles.

Further, one or more magnetic bodies 370 may be coupled to each of the first sub-gear 310, the second sub-gear 320, and the third sub-gear 330.

The first magnetic sensor 410 may detect a change in magnetic force of the first sub-gear 310.

The second magnetic sensor 420 may detect a change in magnetic force of the second sub-gear 320.

The third magnetic sensor 430 may detect a change in magnetic force of the third sub-gear 330.

The first magnetic sensor 410, the second magnetic sensor 420, and the third magnetic sensor 430 may be mounted on a circuit board 400.

In this case, the first magnetic sensor 410, the second magnetic sensor 420, and the third magnetic sensor 430 may be disposed to face the magnetic bodies 370 coupled to the first sub-gear 310, the second sub-gear 320, and the third sub-gear 330, respectively.

For instance, as the first magnetic sensor 410, the second magnetic sensor 420, and the third magnetic sensor 430, one or more of an Anisotropic Magneto Resistive (AMR) sensor, a Giant Magneto Resistance (GMR) sensor or a Hall sensor may be used.

The control device 700 calculates the steering angle from the change in magnetic force detected by each of the first magnetic sensor 410, the second magnetic sensor 420, and the third magnetic sensor 430. For instance, the control device 700 may be an electronic control unit (ECU). The control device or controller 700 may include, for example, but not be limited to, a processor, computer, digital signal processor (DSP), memory, storage, register, timing, interrupt, communication interface, and input/output signal interfaces, and the like, as well as combinations comprising at least one of the foregoing. For example, the control device or controller 700 may comprise a processor, a storage medium and/or programmable memory, which are capable of storing and executing one or more algorithms, commands, signals, instructions or methods to effect control of the vehicle. The control device or controller 700 may be in communication with numerous sensors, communication systems, and other electronic control units (ECU) of the vehicle.

Hereinafter, a method of calculating the steering angle by the control device 700 will be described in detail with reference to FIGS. 2 to 4.

Figure 2:
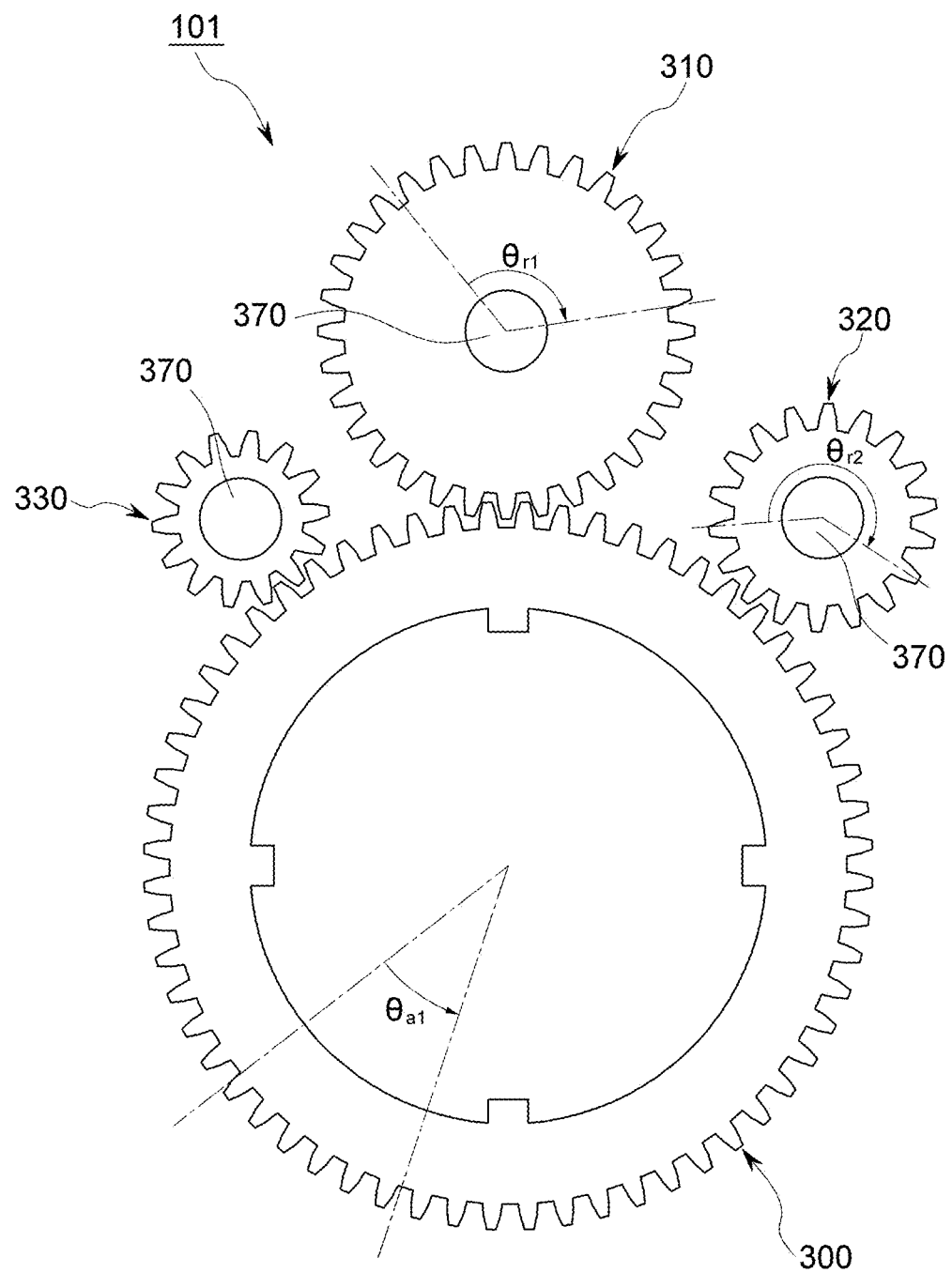
FIG. 2 is a conceptual diagram illustrating a process in which the steering angle sensing device of FIG. 1 calculates a first absolute angle.

First, as shown in FIG. 2, a first relative angle $\theta_{r1}$ at which the first sub-gear 310 rotates as the main gear 300 rotates and a second relative angle $\theta_{r2}$ at which the second sub-gear 320 rotates as the main gear 300 rotates are detected.

To be more specific, as the steering shaft of the vehicle rotates, the main gear 300 connected to the steering shaft is rotated in the same direction as the steering shaft, and the first sub-gear 310 and the second sub-gear 320 engaging with the main gear 300 are rotated in a direction opposite to the rotating direction of the main gear 300. Here, since the first sub-gear 310 and the second sub-gear 320 have different numbers of teeth, they rotate at different rotation ratios.

Further, if the first sub-gear 310 and the second sub-gear 320 rotate, the magnetic body coupled to each of the first sub-gear 310 and the second sub-gear 320 is also rotated, the first magnetic sensor 410 detects the change in magnetic force due to the rotation of the first sub-gear 310 to detect the first relative angle $\theta_{r1}$ at which the first sub-gear 310 rotates, and the second magnetic sensor 420 detects the change in magnetic force due to the rotation of the second sub-gear 320 to detect the second relative angle $\theta_{r2}$ at which the second sub-gear 320 rotates.

The control device 700 may calculate a first absolute angle $\theta_{a1}$ using the first relative angle $\theta_{r1}$ and the second relative angle $\theta_{r2}$.

To be more specific, the control device 700 calculates a reference index for detecting the first absolute angle $\theta_{a1}$ using the first relative angle $\theta_{r1}$ and the second relative angle $\theta_{r2}$, extracts a reference angle component of the first absolute angle $\theta_{a1}$ corresponding to the reference index from a previously built absolute-angle reference angle matrix, and then calculates the first absolute angle $\theta_{a1}$ using the number of teeth st1 of the first sub-gear 310, the number of teeth st2 of the second sub-gear 320, the number of teeth mt of the main gear 300, and the extracted reference angle component of the first absolute angle $\theta_{a1}$.

Figure 3:
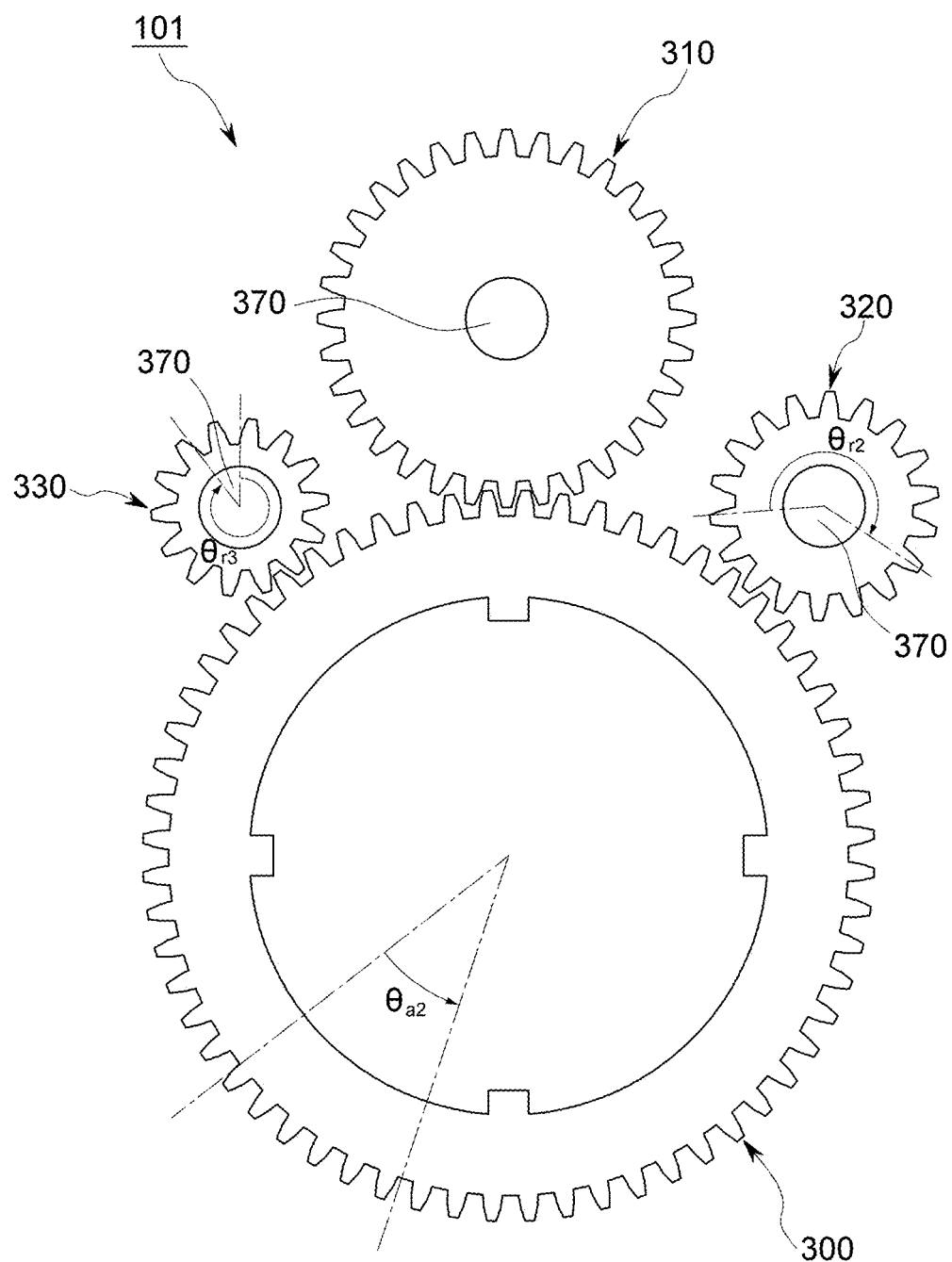
FIG. 3 is a conceptual diagram illustrating a process in which the steering angle sensing device of FIG. 1 calculates a second absolute angle.

Next, as shown in FIG. 3, the second relative angle $\theta_{r2}$ at which the second sub-gear 320 rotates as the main gear 300 rotates, and the third relative angle $\theta_{r3}$ at which the third sub-gear 330 rotates as the main gear 300 rotates are detected.

To be more specific, as the steering shaft of the vehicle rotates, the main gear 300 connected to the steering shaft is rotated in the same direction as the steering shaft, and the second sub-gear 320 and the third sub-gear 330 engaging with the main gear 300 are rotated in a direction opposite to the rotating direction of the main gear 300. Here, since the second sub-gear 320 and the third sub-gear 330 have different numbers of teeth, they rotate at different rotation ratios.

Further, if the second sub-gear 320 and the third sub-gear 330 rotate, the magnetic body coupled to each of the second sub-gear 320 and the third sub-gear 330 is also rotated, the second magnetic sensor 420 detects the change in magnetic force due to the rotation of the second sub-gear 320 to detect the second relative angle $\theta_{r2}$ at which the second sub-gear 320 rotates, and the third magnetic sensor 430 detects the change in magnetic force due to the rotation of the third sub-gear 330 to detect the third relative angle $\theta_{r3}$ at which the third sub-gear 330 rotates.

The control device 700 may calculate a second absolute angle $\theta_{a2}$ using the second relative angle $\theta_{r2}$ and the third relative angle $\theta_{r3}$.

To be more specific, the control device 700 calculates a reference index for detecting the second absolute angle $\theta_{a2}$ using the second relative angle $\theta_{r2}$ and the third relative angle $\theta_{r3}$, extracts a reference angle component of the second absolute angle $\theta_{a2}$ corresponding to the reference index from the previously built absolute-angle reference angle matrix, and then calculates the second absolute angle $\theta_{a2}$ using the number of teeth st2 of the second sub-gear 320, the number of teeth st3 of the third sub-gear 330, the number of teeth mt of the main gear 300, and the extracted reference angle component of the second absolute angle $\theta_{a2}$.

Figure 4:
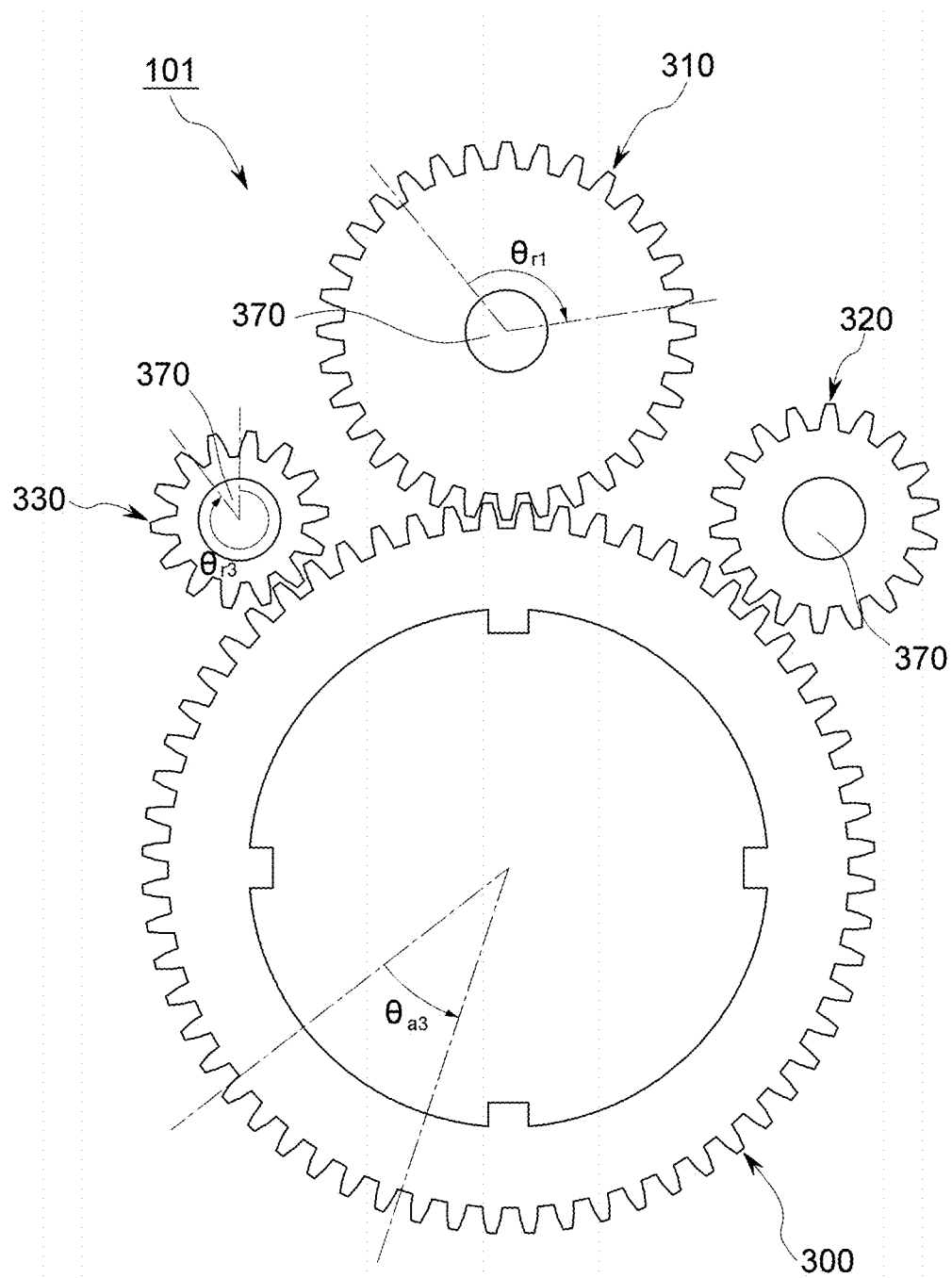
FIG. 4 is a conceptual diagram illustrating a process in which the steering angle sensing device of FIG. 1 calculates a third absolute angle.

Next, as shown in FIG. 4, the first relative angle $\theta_{r1}$ at which the first sub-gear 310 rotates as the main gear 300 rotates, and the third relative angle $\theta_{r3}$ at which the third sub-gear 330 rotates as the main gear 300 rotates are detected.

To be more specific, as the steering shaft of the vehicle rotates, the main gear 300 connected to the steering shaft is rotated in the same direction as the steering shaft, and the first sub-gear 310 and the third sub-gear 330 engaging with the main gear 300 are rotated in a direction opposite to the rotating direction of the main gear 300. Here, since the first sub-gear 310 and the third sub-gear 330 have different numbers of teeth, they rotate at different rotation ratios.

Further, if the first sub-gear 310 and the third sub-gear 330 rotate, the magnetic body coupled to each of the first sub-gear 310 and the third sub-gear 330 is also rotated, the first magnetic sensor 410 detects the change in magnetic force due to the rotation of the first sub-gear 310 to detect the first relative angle $\theta_{r1}$ at which the first sub-gear 310 rotates, and the third magnetic sensor 430 detects the change in magnetic force due to the rotation of the third sub-gear 330 to detect the third relative angle $\theta_{r3}$ at which the third sub-gear 330 rotates.

The control device 700 may calculate a third absolute angle $\theta_{a3}$ using the first relative angle $\theta_{r1}$ and the third relative angle $\theta_{r3}$.

To be more specific, the control device 700 calculates a reference index for detecting the third absolute angle $\theta_{a3}$ using the first relative angle $\theta_{r1}$ and the third relative angle $\theta_{r3}$, extracts a reference angle component of the third absolute angle $\theta_{a3}$ corresponding to the reference index from the previously built absolute-angle reference angle matrix, and then calculates the third absolute angle $\theta_{a3}$ using the number of teeth st1 of the first sub-gear 310, the number of teeth st3 of the third sub-gear 330, the number of teeth mt of the main gear 300, and the extracted reference angle component of the third absolute angle $\theta_{a3}$.

Next, the control device 700 may cross-verify the first absolute angle $\theta_{a1}$, the second absolute angle $\theta_{a2}$, and the third absolute angle $\theta_{a3}$. Thus, the precision of the absolute angle calculated by the control device 700 can be greatly improved.

Further, the control device 700 may also diagnose whether the steering angle sensing device 101 is normally operated.

For example, if the first absolute angle $\theta_{a1}$ is the same as the second absolute angle $\theta_{a2}$ and is different from the third absolute angle $\theta_{a3}$, the first absolute angle $\theta_{a1}$ and the second absolute angle $\theta_{a2}$ may be determined as a final absolute angle. Moreover, as the third absolute angle $\theta_{a3}$ is different, it is possible to self-diagnose that there is an error in the third sub-gear 330 or the third magnetic sensor 430.

Further, if all of the first absolute angle $\theta_{a1}$, the second absolute angle $\theta_{a2}$, and the third absolute angle $\theta_{a3}$ are different from each other, the anomaly of the steering angle sensing device 101 may be notified to the driver so as to induce inspection and replacement.

Through such a configuration, the steering angle sensing device 101 according to the first embodiment of the present disclosure can significantly improve the precision of the steering angle to be detected. Further, it is possible to self-diagnose whether the steering angle sensing device 101 is abnormal.

To be more specific, the steering angle sensing device 101 according to the first embodiment of the present disclosure adds one sub-gear to a conventional device using two sub-gears, thus allowing two absolute angles to be further calculated. As a result, it is possible to calculate and then cross-verify a total of three absolute angles, thereby greatly improving the precision and reliability of the measured absolute angle.

Hereinafter, a second embodiment of the present disclosure will be described with reference to FIGS. 5 and 6.

Figure 5:
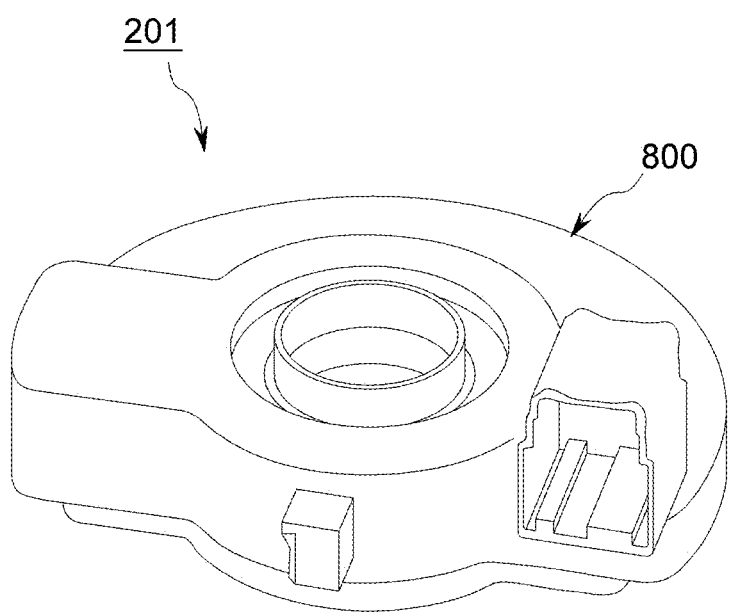
FIG. 5 is a perspective view showing a torque angle sensor module according to a second embodiment of the present disclosure.
Figure 6:
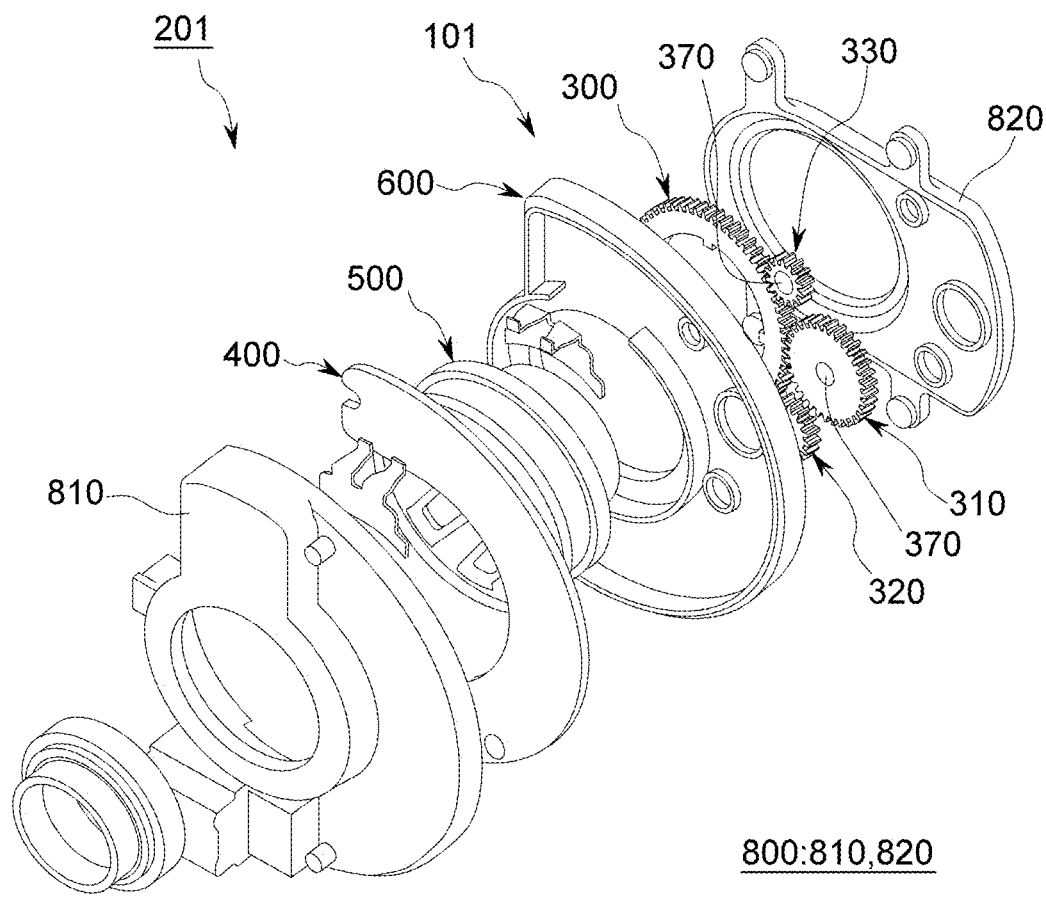
FIG. 6 is an exploded perspective view showing the torque angle sensor module of FIG. 5.

As shown in FIGS. 5 and 6, a torque angle sensor module 201 according to the second embodiment of the present disclosure includes a torque measuring device 500 and a steering angle sensing device 101. Here, the steering angle sensing device 101 is the same as the steering angle sensing device 101 described in the first embodiment.

The torque angle sensor module 201 according to the second embodiment of the present disclosure may further include a support member 600 and a case 800.

The torque measuring device 500 may be coupled to the steering shaft to measure a steering torque.

For example, the torque measuring device 500 may be a torque rotor. Such a torque rotor may include a body portion having a magnetic body along an outer circumference thereof, an input shaft insert hole formed in the center of the body portion, several compression portions protruding along the circumference of the input shaft insert hole, and a compression ring fitted into the compression portion. Here, the input shaft may become the steering shaft. The body portion is usually made by injection molding plastic or the like on an annular ring-shaped yoke, and the magnetic body in which N and S poles are alternately repeated along the circumference may be provided on the outer circumference thereof. The input shaft insert hole into which the input shaft is inserted is formed in the center of the body portion, and the compression ring protrudes along the circumference of the input shaft insert hole to be inserted into several compression portions. The compression ring is shaped like an annular ring with a certain portion being cut out, and serves to fix the input shaft along with the compression portion.

The support member 600 may align and support the circuit board 400, the first sub-gear 310, the second sub-gear 320, and the third sub-gear 330. In other words, the support member 600 may stably align the first magnetic sensor 410, the second magnetic sensor 420, and the third magnetic sensor 430 mounted on the circuit board 400 inside the case 800, which will be described later, with the first sub-gear 310, the second sub-gear 320, and the third sub-gear 330.

The case 800 may accommodate the torque measuring device 500, the steering angle sensing device 101, and the support member 600 therein. In this case, the case 800 may include a first case 810 and a second case 820 which are provided on front and rear portions to be coupled to each other, and the torque measuring device 500, the steering angle sensing device 101, and the support member 600 may be accommodated in an accommodation space between the first case 810 and the second case 820.

Through such a configuration, the torque angle sensor module 201 according to the second embodiment of the present disclosure can not only precisely detect the steering angle by the steering angle sensor 101 but also measure the steering torque.

Figure 7:
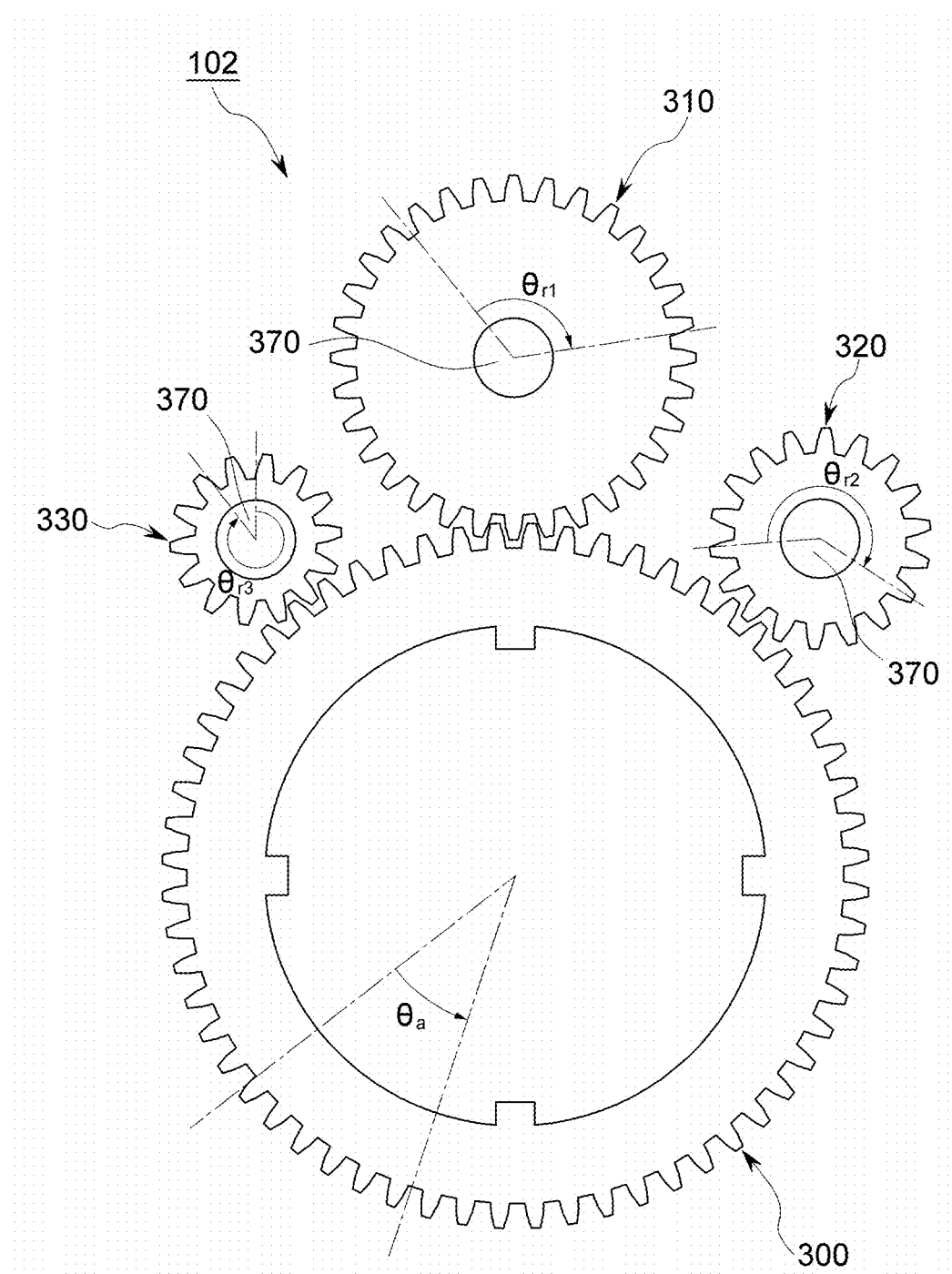
FIG. 7 is a conceptual diagram illustrating a process in which a steering angle sensing device according to a third embodiment of the present disclosure calculates a third absolute angle.

Hereinafter, a third embodiment of the present disclosure will be described with reference to FIG. 7.

The steering angle sensing device 102 according to the third embodiment of the present disclosure has the same configuration as the above-described steering angle sensing device 101 according to the first embodiment, but has a different steering angle calculating method.

To be more specific, in the third embodiment of the present disclosure, the control device 700 may calculate an absolute angle $\theta_a$ using all of the first relative angle $\theta_{r1}$, the second relative angle $\theta_{r2}$, and the third relative angle $\theta_{r3}$.

The range of the absolute angle $\theta_a$ which may be calculated by the control device 700 using all of the first relative angle $\theta_{r1}$, the second relative angle $\theta_{r2}$, and the third relative angle $\theta_{r3}$ may be set larger than the range of the absolute angle $\theta_{a1}$, $\theta_{a2}$, or $\theta_{a3}$ which may be calculated using two relative angles among the first relative angle $\theta_{r1}$, the second relative angle $\theta_{r2}$, and the third relative angle $\theta_{r3}$ as in the first embodiment.

In other words, when the absolute angle $\theta_a$ is calculated at once using all of the three relative angles $\theta_{r1}$, $\theta_{r2}$, and $\theta_{r3}$, the absolute angle measuring range may be increased.

For example, according to the above-described first embodiment, the steering angle sensing device 101 may measure the steering angle of the steering wheel within the range of 4 to 5 rotations. On the other hand, according to the third embodiment of the present disclosure, the steering angle sensing device 102 may measure the steering angle of the steering wheel within the range of 7 to 8 rotations through the same configuration.

Through such a configuration, the steering angle sensing device 102 according to the third embodiment of the present disclosure can increase the detectable rotation angle of the steering angle.

Although the embodiments of the present disclosure have been described with reference to the accompanying drawings, those skilled in the art to which the present disclosure pertains will understand that the present disclosure can be carried out in different forms without changing the technical spirit or essential features.

Therefore, the above-described embodiments should be understood as illustrative and not restrictive in all respects, and the scope of the present disclosure is defined by the claims that will be described later. All changes or modifications derived from the meaning and scope of the claims and their equivalent concepts should be construed as being included in the scope of the present disclosure.

DETAILED DESCRIPTION OF MAIN ELEMENTS

- 101: steering angle sensing device
- 201: torque angle sensor module
- 300: main gear
- 310: first sub-gear
- 320: second sub-gear
- 330: third sub-gear
- 370: magnetic body
- 400: circuit board
- 410: first magnetic sensor
- 420: second magnetic sensor
- 430: third magnetic sensor
- 500: torque measuring device
- 600: support member
- 700: control device
- 800: case
- 810: first case
- 820: second case

What is claimed is:

1. A steering angle sensing device comprising:
a main gear configured to be rotatable in association with rotation of a steering shaft;
a first sub-gear rotatably engaged with the main gear;
a second sub-gear rotatably engaged with the main gear, wherein a number of teeth of the second sub-gear is different from a number of teeth of the first sub-gear;
a third sub-gear rotatably engaged with the main gear, wherein a number of teeth of the third sub-gear is different from the number of the teeth of the first sub-gear and the number of the teeth of the second sub-gear;
a first magnetic sensor configured to detect a change in a magnetic force of the first sub-gear;
a second magnetic sensor configured to detect a change in a magnetic force of the second sub-gear;
a third magnetic sensor configured to detect a change in a magnetic force of the third sub-gear; and
a processor configured to calculate a steering angle based on the changes in the magnetic forces of the first, second, and third sub-gears detected by the first, second, and third magnetic sensors, respectively.

2. The steering angle sensing device of claim 1, further comprising:
a circuit board to which the first magnetic sensor, the second magnetic sensor, and the third magnetic sensor are mounted.

3. The steering angle sensing device of claim 1, wherein one or more bodies having magnetic material are attached to the first sub-gear, the second sub-gear, and the third sub-gear.

4. The steering angle sensing device of claim 3, wherein the first magnetic sensor, the second magnetic sensor, and the third magnetic sensor are disposed to face the bodies having the magnetic material attached to the first sub-gear, the second sub-gear, and the third sub-gear, respectively.

5. The steering angle sensing device of claim 1, wherein the processor is configured to calculate:
a first relative angle of the first sub-gear with respect to the main gear;
a second relative angle of the second sub-gear with respect to the main gear; and
a third relative angle of the third sub-gear with respect to the main gear.

6. The steering angle sensing device of claim 5, wherein the processor is configured to calculate:
a first absolute angle calculated using the first relative angle of the first sub-gear with respect to the main gear and the second relative angle of the second sub-gear with respect to the main gear;
a second absolute angle calculated using the second relative angle of the second sub-gear with respect to the main gear and the third relative angle of the third sub-gear with respect to the main gear; and
a third absolute angle calculated using the first relative angle of the first sub-gear with respect to the main gear and the third relative angle of the third sub-gear with respect to the main gear.

7. The steering angle sensing device of claim 6, wherein the processor is configured to cross-verify the first absolute angle, the second absolute angle, and the third absolute angle to determine a final absolute angle.

8. The steering angle sensing device of claim 1, wherein the processor is configured to calculate an absolute angle using all of a first relative angle of the first sub-gear with respect to the main gear, a second relative angle of the second sub-gear with respect to the main gear, and a third relative angle of the third sub-gear with respect to the main gear.

9. The steering angle sensing device of claim 8, wherein a range of the absolute angle calculated by the processor using all of the first relative angle, the second relative angle, and the third relative angle is set larger than a range of the absolute angle calculated using two relative angles among the first relative angle, the second relative angle, and the third relative angle.

10. A torque angle sensor module comprising:
a steering angle sensing device configured to detect a steering angle of a steering shaft,
wherein the steering angle sensing device comprises:
a main gear configured to be rotatable in association with rotation of the steering shaft;
a first sub-gear rotatably engaged with the main gear;
a second sub-gear rotatably engaged with the main gear, wherein a number of teeth of the second sub-gear is different from a number of teeth of the first sub-gear;
a third sub-gear rotatably engaged with the main gear, wherein a number of teeth of the third sub-gear is different from the number of the teeth of the first sub-gear and the number of the teeth of the second sub-gear;
a first magnetic sensor configured to detect a change in a magnetic force of the first sub-gear;
a second magnetic sensor configured to detect a change in a magnetic force of the second sub-gear;
a third magnetic sensor configured to detect a change in a magnetic force of the third sub-gear; and
a processor configured to calculate the steering angle based on the changes in the magnetic forces of the first, second, and third sub-gears detected by the first, second, and third magnetic sensors, respectively.

11. The torque angle sensor module of claim 10, wherein the steering angle sensing device further comprises a circuit board to which the first magnetic sensor, the second magnetic sensor, and the third magnetic sensor are mounted.

12. The torque angle sensor module of claim 10, wherein one or more bodies having magnetic material are attached to the first sub-gear, the second sub-gear, and the third sub-gear.

13. The torque angle sensor module of claim 12, wherein the first magnetic sensor, the second magnetic sensor, and the third magnetic sensor are disposed to face the bodies having the magnetic material attached coupled to the first sub-gear, the second sub-gear, and the third sub-gear, respectively.

14. The torque angle sensor module of claim 10, wherein the processor is configured to calculate:
a first relative angle of the first sub-gear with respect to the main gear;
a second relative angle of the second sub-gear with respect to the main gear; and
a third relative angle of the third sub-gear with respect to the main gear.

15. The torque angle sensor module of claim 14, wherein the processor is configured to calculate:
a first absolute angle calculated using the first relative angle of the first sub-gear with respect to the main gear and the second relative angle of the second sub-gear with respect to the main gear;
a second absolute angle calculated using the second relative angle of the second sub-gear with respect to the main gear and the third relative angle of the third sub-gear with respect to the main gear; and
a third absolute angle calculated using the first relative angle of the first sub-gear with respect to the main gear and the third relative angle of the third sub-gear with respect to the main gear.

16. The torque angle sensor module of claim 15, wherein the processor is configured to cross-verify the first absolute angle, the second absolute angle, and the third absolute angle to determine a final absolute angle.

17. The torque angle sensor module of claim 10, wherein the processor is configured to calculate an absolute angle using all of a first relative angle of the first sub-gear with respect to the main gear, a second relative angle of the second sub-gear with respect to the main gear, and a third relative angle of the third sub-gear with respect to the main gear.

18. The torque angle sensor module of claim 17, wherein a range of the absolute angle calculated by the processor using all of the first relative angle, the second relative angle, and the third relative angle is set larger than a range of the absolute angle calculated using two relative angles among the first relative angle, the second relative angle, and the third relative angle.

19. The torque angle sensor module of claim 10, further comprising:
a support aligning and supporting the circuit board, the first sub-gear, the second sub-gear, and the third sub-gear.

20. The torque angle sensor module of claim 19, further comprising:
a case accommodating the steering angle sensing device, and the support therein.

* * * * *